United States Patent
Nisley (10) Patent No.: US 7,217,193 B2
(45) Date of Patent: May 15, 2007

(54) SHAFT COUPLING SYSTEM AND METHOD

(75) Inventor: Donald L. Nisley, Greenville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 250 days.

(21) Appl. No.: 10/952,191

(22) Filed: Sep. 28, 2004

(65) Prior Publication Data

US 2006/0068923 A1    Mar. 30, 2006

(51) Int. Cl.
*F16D 3/50* (2006.01)
(52) U.S. Cl. .......................... 464/80; 464/88
(58) Field of Classification Search ................ 464/79, 464/80, 87, 88, 92; 403/223
See application file for complete search history.

(56) References Cited

U.S. PATENT DOCUMENTS

| | | | |
|---|---|---|---|
| 738,445 A | 9/1903 | Hoffmann | |
| 851,419 A | 4/1907 | Hess | |
| 1,561,443 A | 11/1925 | Searles | |
| 2,519,927 A | 8/1950 | Pedu, Jr. | |
| 2,584,740 A | 2/1952 | Reynolds | |
| 2,728,616 A | 12/1955 | Potter | |
| 2,740,676 A | 4/1956 | Potter | |
| 3,020,737 A * | 2/1962 | Firth | 464/80 |
| 3,036,872 A | 5/1962 | King, Jr. et al. | |
| 3,239,292 A | 3/1966 | Howe, Jr. et al. | |
| 3,521,342 A | 7/1970 | Van Dorn et al. | |
| 4,164,063 A | 8/1979 | Cenko et al. | |
| 5,011,306 A | 4/1991 | Martinie | |
| 5,489,156 A | 2/1996 | Martinie | |
| 5,685,650 A | 11/1997 | Martinie et al. | |
| 5,709,483 A | 1/1998 | Martinie | |
| 5,749,659 A | 5/1998 | Nisley | |
| 5,897,214 A | 4/1999 | Nisley | |
| 5,908,248 A | 6/1999 | Nisley | |
| 5,908,249 A | 6/1999 | Nisley et al. | |
| 5,910,049 A | 6/1999 | DeWachter et al. | 464/80 |

FOREIGN PATENT DOCUMENTS

| | | | | |
|---|---|---|---|---|
| DE | 921 183 | * | 12/1954 | 464/80 |
| FR | 1.034.034 | * | 7/1953 | 464/88 |
| JP | 05026247 | | 2/1993 | |

* cited by examiner

*Primary Examiner*—Greg Binda
(74) *Attorney, Agent, or Firm*—Thompson Coburn LLP (57) ABSTRACT

A coupling assembly having an integral flange hub configured to bear against a flexible coupling element, and an external flange element configured to engage the hub to exert compressive force on the flexible coupling element. The assembly further includes a nut having inner threads configured to mate with a threaded extension of the hub to urge the hub and the external flange element into engagement with the flexible coupling element. The assembly may also include a tapered sleeve and a sleeve nut having inner threads configured to mate with the threaded extension of the tapered sleeve to secure the hub with a shaft.

14 Claims, 4 Drawing Sheets

SHAFT COUPLING SYSTEM AND METHOD

BACKGROUND

The present invention relates generally to coupling systems for transmitting mechanical power between a motor or other prime mover and a driven machine. More particularly, the invention relates to a flexible coupling system permitting a certain degree of misalignment between driving and driven shafts, which is easy to install and which provides enhanced torque-carrying capacity via an elastomeric element disposed between the shafts.

BRIEF DESCRIPTION

A great number of applications exist for rotating machinery including a prime mover or driver coupled to a driven piece of machinery. In many industrial and other applications, such prime movers include electric motors, hydraulic motors, pneumatic motors, internal combustion engines and so forth. These prime movers are commonly used to drive pumps, conveyers, agitators, fans, as well as a great variety of other machines.

In general, such systems may transmit power from the prime mover to the driven shaft in a variety of ways. For example, direct couplings may be interposed between the shafts, aligning the shafts axially with one another for direct transmission of rotary motion. Historically, fairly rigid couplings required that the shafts be carefully aligned with one another in order to reduce cyclic loading on both the coupling and the shafts, and on bearing sets supporting the shafts. More modern systems include various types of flexible couplings, generally including elastomeric elements interposed between coupling hardware, which permit some degree of misalignment between the shafts, while effectively transmitting power therebetween. Such flexible couplings also provide some degree of cushioning of torque spikes, and facilitate coupling and uncoupling of the prime mover with the driven shaft.

Various forms of flexible couplings have been proposed and are commercially available. In one known arrangement a tire-like flexible element is interposed between attachment structures supported on each shaft. The attachment structures include a hub or bushing which is secured to the shaft, such as by means of a conventional key or tapered locking bushing arrangement. The hub supports a flanged attachment structure including a peripheral or outer flange that extends in a plane perpendicular to the axis of the shaft. The elastomeric coupling element is annular in shape and is split transversely to allow it to be opened and slipped over a gap between the attachment structures. The flexible element includes a peripheral bead or boot on either side which is inserted between each support flange and a retaining flange. The retaining flanges are then tightly secured to the attachment flanges by means of bolts that extend axially, radially, or therebetween. As the entire structure is drawn together, the boot on either side of the flexible element is compressed, producing a retention force between the flanges and the flexible element. The retention force, in combination with the coefficient of friction between the flexible element and its mounting structures affords torque-carrying capacity to the coupling assembly. Coupling systems of this type are commercially available from the Dodge Division of Reliance Electric Industrial Company, under the commercial designation Paraflex.

While such couplings provide good performance and conveniently permit some degree of misalignment between the driving and driven shafts, they are not without drawbacks. For example, couplings of the type described above may be somewhat difficult to assemble depending upon surrounding obstructions and on the spacing between the prime mover and the driven machine. In particular, clearances of the bolts (whether extending axially, radially, or therebetween) may be fairly short where surrounding obstructions are in close proximity or where the machines are placed close to one another. Such situations make the bolts difficult to insert and tighten into their corresponding threaded bores in the coupling flanges.

In addition, even without obstructions or close spacing, the sheer number of parts (including the bolts, flanges, and other components) in a standard coupling system contribute to the difficulty and time of installing the coupling assembly. Such complexity increases costs and downtime associated with the installation and operation of couplings systems and rotating machinery. Further, coupling systems of the type described above often require a significant inventory of relatively expensive mounting structures to accommodate varying shaft sizes. Finally, while the couplings of the type described above in many applications provide adequate torque-carrying capacity, there is a continuous demand in the industry to increase such capacity to advantageously downsize coupling system components, to better accommodate torque spikes, to extend operating periods between coupling failures, and so forth.

Accordingly, there is a need for an improved flexible coupling system which is both extremely rugged and easy to install, even in applications where surrounding obstructions exist or where spacing between driving and driven components is relatively restricted. Similarly, there is a need to lessen the size and number of coupling system components to improve ease of assembly, so to improve ergonomics, reduce assembly/disassembly time, and reduce costs. Further, there is a need for more adaptable systems that more efficiently secure shafts of different sizes. Finally, there is a need to increase torque-carrying capacity to permit downsizing of components, for example, and to meet the ever-increasing demand of more stringent applications.

BRIEF DESCRIPTION

The invention provides an innovative flexible coupling system having a novel securing configuration designed to respond to these needs. For example, a nut or locknut arrangement may be employed in lieu of a typical bolting arrangement to quickly and firmly join a flexible coupling element and the driving and driven shafts. The locknut arrangement compresses and secures the flexible or elastomeric coupling element positioned between mounting structures, such as coupling hub assemblies, that are supported on the shafts. The securing configuration (e.g., a locknut arrangement) is strikingly effective in installation and use, and significantly facilitates assembly and disassembly of the structure. Further, the torque-carrying capacity is notably increased, permitting smaller coupling system components, for example. Moreover, the technique may utilize a novel sleeve/sleeve nut configuration or bushing system to mount structures, such as coupling hub assemblies, to the shafts and other mechanical elements. The sleeve and sleeve nut arrangement significantly improves the ease of securing the hub assemblies to the shafts, as well as, provides for less expensive accommodation of different size shafts. In sum, the present techniques reduce bolting requirements and the numbers of coupling parts, improve ease-of-assembly, increase torque-carrying capacity, and reduce costs and downtime associated with installation and operation of coupling systems and rotating machinery.

In one embodiment, a coupling assembly includes a hub having a flange configured to bear against a flexible coupling element. An external flange element is configured to engage the hub to exert compressive force on the flexible coupling element. A nut having inner threads is configured to mate with a threaded extension of the hub to urge the hub and the external flange element into engagement with the flexible coupling element.

In another embodiment, a system for securing two generally axially-aligned shafts includes a flexible coupling element configured to be received by both a first hub assembly and a second hub assembly to secure a first shaft with a second shaft. The first hub assembly includes a first hub having a flange and mountable on the first shaft, the first hub flange bearable against the flexible coupling element and having a threaded extension. The first assembly also includes a first outer flange configured to engage the first hub to exert compressive force on the flexible coupling element. Finally, the first assembly includes a first nut having inner threads and configured to mate with the threaded extension of the first hub to force the first hub flange and the first outer flange into engagement with the flexible coupling element. A second hub assembly may include similar or identical-type items.

In yet another embodiment, a technique for installing a coupling hub assembly onto a shaft, includes placing a nut, an external flange element, and an inner flange hub onto a shaft, sliding the external flange element into engagement with the inner flange hub, and installing a flexible coupling element in between the external flange element and the inner flange hub. A nut having an inner threaded surface is threaded onto a threaded surface of the inner flange hub to tighten the nut against the external flange element to compress the flexible coupling element between the external flange element and the inner flange hub. In a related example, to disassemble a coupling hub assembly from a shaft, the nut is counterrotated to loosen the nut from a threaded surface of an inner flange hub to disengage the inner flange hub from an external flange element. The flexible coupling element is removed from between the inner flange hub and the external flange element. The nut, the external flange element, and the inner flange hub may all be loosened or removed from the shaft.

DRAWINGS

The foregoing and other features of the invention will become apparent upon reading the following detailed description and upon reference to the drawings in which.

DETAILED DESCRIPTION

Figure 1:
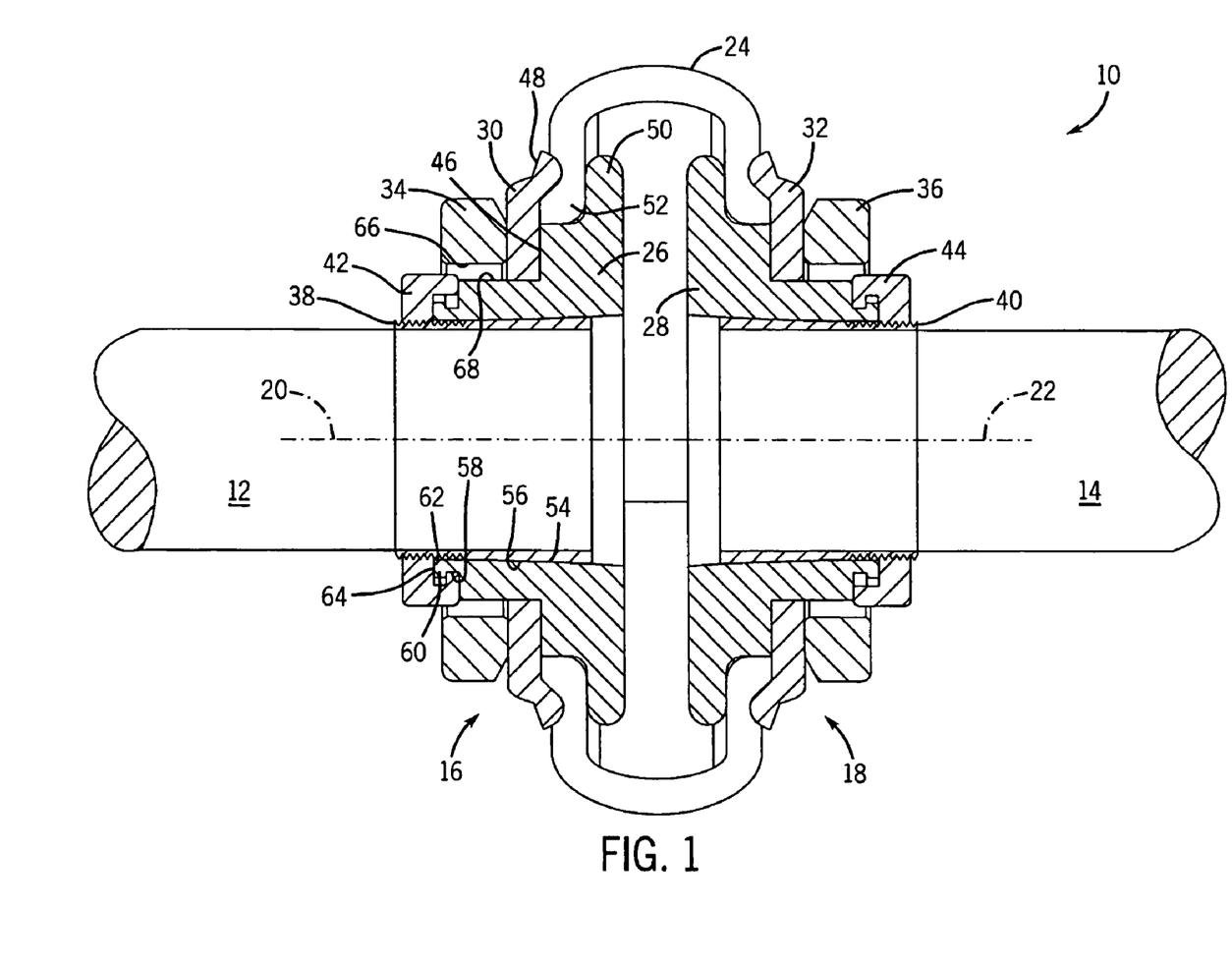
FIG. 1 is a sectional view of an of a coupling system for coupling a first shaft and a second shaft in accordance with certain aspects of the present invention.

In general, the present technique provides for the mounting of structures, such as hub assemblies and other hollow members, onto mechanical elements (e.g., shafts) to secure the mechanical elements to one another. For example, FIG. 1 illustrates a coupling system, designated generally by the reference numeral 10, for coupling a first shaft 12 to a second shaft 14. An example of the first shaft 12 is an output shaft from an electric motor, and an example of the second shaft 14 is an input shaft of a driven machine, such as a foot-mounted pump. It should be emphasized that while reference is made to a prime mover in the form of an electric motor and to a driven machine in the form of a pump, the coupling system described herein is not limited to application with any particular type of prime mover or driven machine. In particular, the coupling system can be applied to a wide range of input power sources, such as internal combustion engines, hydraulic motors, jack shafts coupled to upstream power sources, sprocket or chain drives and so forth. Similarly, coupling system 10 may be applied to any suitable driven element, such as conveyors, drive pulleys, fans, agitators, and so forth.

Also, it should be apparent that mechanical elements other than shafts may employ the present system, such as inner hubs, support extensions, gearing, pinions, and so forth. Moreover, both the driving and driven elements to which coupling system 10 is applied may be rigidly mounted on a machine base, or may be secured by any other suitable means, such as by support adapters, spacing adapters and the like. Finally, coupling system 10 may be applied to mechanical elements, such as shafts 12 and 14, aligned in any desired orientation, including horizontally, vertically, and at various angles therebetween.

The embodiment depicted as system 10 in FIG. 1 includes a first hub assembly 16 mounted on the first shaft 12, and a second hub assembly 18 mounted on the second shaft 14. In this example, both hub assemblies 16 and 18 are coaxial with one another, along axes 20 and 22 of the first shaft 12 and second shaft 14, respectively. A flexible, composite coupling element 24 is secured to hub assemblies 16 and 18 to secure the shafts in a manner more fully described below. Coupling element 24 may be a generally annular component made of a composite material comprising resilient rubber or plastic in which fibrous or textile reinforcing layers are embedded. Further, element 24 may be split transversely to allow it to be opened and fitted over both hub assemblies for installation, as described below. In operation, power is transmitted from shaft 12 to shaft 14 by the intermediary of hub assemblies 16 and 18 and coupling element 24. Coupling element 24 permits some degree of misalignment between axes 20 and 22, while effectively transmitting torque between the shafts 12 and 14.

Hub assemblies 16 and 18 may be secured to their respective shafts 12 and 14 in several ways, such as in spline, key, tapered, and/or straight bore arrangements. In the illustrated example, the hub assemblies are secured to the shafts in a taper configuration, where a tapered sleeve is inserted between the hub and the shaft, with the hub having a tapered bore, as discussed below. However, again, it should be emphasized that other configurations may be used. For example, in a straight bore configuration, two tapered sleeves may be inserted between each hub and shaft, with the hubs having a cylindrical bore. Further, the hubs and shafts may have one or more mating spline and/or key elements to secure the hubs to the shafts.

Irrespective of the mounting configuration, the present techniques may use a mounting hub that has an integral flange, such as with the inner flange hub 26, and thus reduce the number of coupling system parts and facilitate assembly. Further, a threaded adjusting nut or locknut may be used in lieu of bolts to urge a floating external (outer) flange or clamp ring into engagement with the inner flange on the hub 26 to tightly clamp and compress the flexible rubber tire-like coupling element 24. Moreover, as indicated, optional spline elements may be included on the mounting hub (e.g., inner flange hub 26) that mate with optional spline elements on the (outer) external flange, and thus the external flange may move axially but not rotate.

It should be noted that bolting arrangements in coupling systems may be problematic due to limited compression and access. In contrast, the present nut configuration promotes compression and facilitates access. For example, the nut arrangement facilitates access by requiring little axial distance. Further, a nut generally gives more compressive force because as the nut abuts against the external flange, the nut provides up to a full 360 degree support (unlike in a bolting system) to clamp the flexible coupling element 24. In this example, clamping forces on the flexible element are increased by as much as two times over typical bolting systems, allowing significant down-sizing of coupling sizes and cost savings.

In the illustrated embodiment, the first inner flange hub 26 of the first assembly and the second inner flange hub 28 of the second assembly may be mounted to their respective shafts 12 and 14. To secure the flexible coupling element 24, and thus the shafts 12 and 14 with one another, the first external flange 30 and the second external flange 32 each compress the coupling element 24 against the flange portion of the respective inner flange hubs 26 and 28. A first locknut 34 and a second locknut 36 urge the external flanges 30 and 32 into engagement with the respective inner flange hubs 26 and 28 to secure the coupling system and two shafts 12 and 14. The locknut configuration may posses a variety of features, such as a "grip-tight" rotation of the locknut using a spanner wrench, for example.

Similarly, the present bushing system or locking arrangement for securing the hubs 26 and 28 to the shafts 12 and 14 may also employ a "grip-tight" system. Further, such bushing systems or locking arrangements typically allow for large bore capability and straightforward assembly. In FIG. 1, a locking arrangement utilizes a tapered sleeve system for securing the hubs 26 and 28 to their respective shafts 12 and 14. The hubs 26 and 28, in this example, have tapered inner surfaces that interface with tapered outer surfaces of a first sleeve 38 and a second sleeve 40, respectively. The inner surfaces of the first and second sleeves 38 and 40 mount against the respective shafts 12 and 14. A first sleeve nut 42 and a second sleeve nut 44 may be rotated onto the respective threaded extensions of the sleeves 38 and 40 to secure the hubs 26 and 28 with the shafts 12 and 14. A benefit of the illustrated sleeve configuration is that the assembly more efficiently accommodates shafts of different sizes with relatively inexpensive inventories of different size sleeves, for example. The sleeve/sleeve nut configuration also typically requires less axial shaft space for access compared to typical arrangements that utilize mounting set screws and clamping bolts.

In sum, the present techniques significantly employ fewer coupling parts and, in general, reduce the time require to mount and assemble the coupling system. In this example, the coupling assembly time is reduced by as much as half in comparison to a coupling configuration that employs a typical bolting arrangement.

For convenience in discussing the present technique in greater detail, surfaces and features of only the first hub assembly 16 are described. The discussion, however, may equally apply to the second hub assembly 18. After all, it is typically the two assemblies 16 and 18 acting in concert that fully secure the flexible element 24 and the two shafts 12 and 14 to one another.

Referring to FIG. 1, as the locknut 34 is rotated or tightened to urge the external flange 30 toward the inner flange hub 26, a stop 46 on the inner flange hub 26 axially positions the external flange 30 with respect to the hub 26. An extension 48 on the external flange 30 and a flange portion 50 of the inner flange hub 26 form a peripheral recess to receive the boot 52 of the flexible coupling element 24. To secure the hub 26 to the shaft 12, a sleeve nut 42 is rotated on a threaded portion of an extension of the tapered sleeve 38. The inner surface of the sleeve 38 bears against the shaft 12 and as the sleeve nut 42 is rotated, the tapered outer surface 56 of the sleeve is pulled into further commitment with the tapered inner surface of the hub 26. In other words, tightening of the sleeve nut 42 draws the tapered sleeve 38 into tight engagement between the hub 26 and shaft 12.

Figures 5, 6:
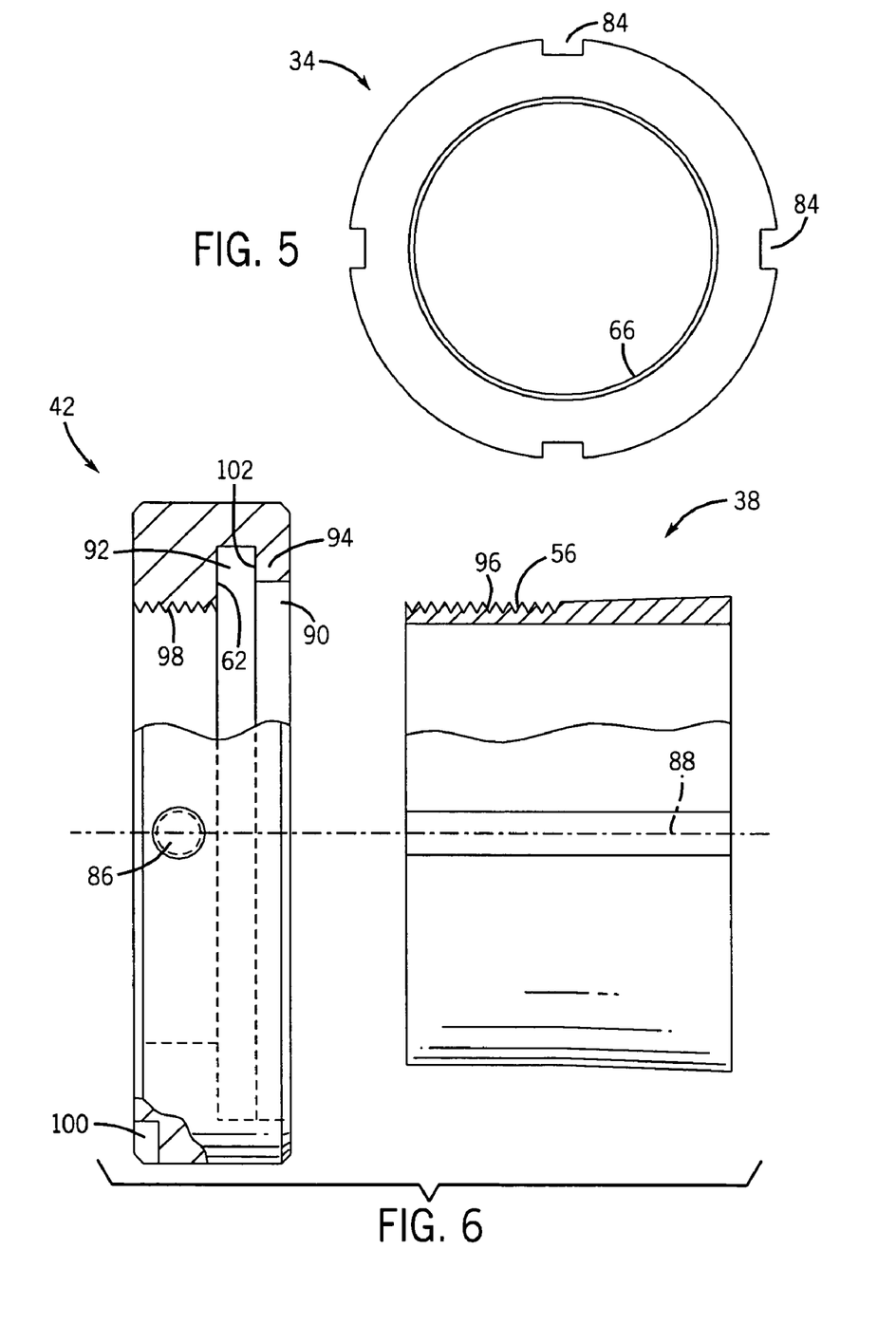
FIG. 5 is an end view of a locknut of the coupling system illustrated in FIG. 1 showing a threaded inner surface and tool recesses for tightening the locknut.
FIG. 6 is a sectional view of a nut and sleeve arrangement of the coupling system illustrated in FIG. 1 for tightening the coupling hub assembly.

The sleeve nut 42 is configured with an eccentric aperture forming a groove and lip having a varying depth (see also FIG. 6). The eccentric aperture permits the sleeve nut to be installed on an extension of the hub 26 having an outer annular groove 58 and lip 60 configured to receive the sleeve nut 42. An abutment face 62 on the sleeve nut 42 engages an end space or distal end 64 on the hub 26, providing an abutment surface for tightly mounting the hub 26 to the shaft 12. Engagement of the sleeve nut 42 on the threaded portion of the tapered sleeve 38 centers the nut 42 and allows the nut to be tightened to draw the assembly 16 into tight engagement. For disassembly, the sleeve nut 42 is rotated in an opposite direction to force the lip 60 bordering the varying depth groove into engagement with corresponding surface of the hub 26, and thereby to force the tapered sleeve 38 out of engagement, freeing the hub 26 from the shaft 12.

As for securing the flexible coupling element 24, the locknut 34 has a threaded inner surface 66 to mate with a threaded surface 68 of the hub 26. As mentioned, rotation of the locknut 34 urges the external flange 30 into engagement with the inner flange hub 26 to compress and secure the flexible coupling element 24. The inner flange hub 26, which has the stop 46 for halting axial movement of the external flange 30, is further illustrated in FIGS. 2 and 3.

Figure 2:
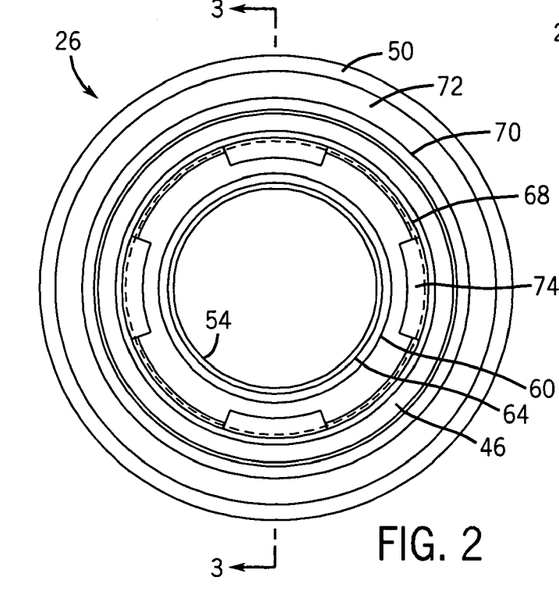
FIG. 2 is an end view of an integral inner flange hub of the coupling system illustrated in FIG. 1.
Figure 3:
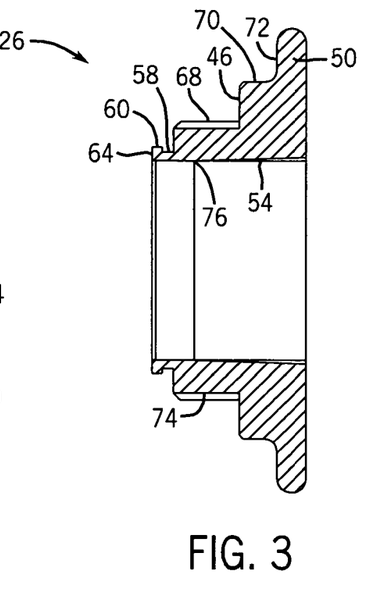
FIG. 3 is a sectional view of the integral inner flange hub illustrated in FIG. 2 sectioned through line 3—3.

FIG. 2 is an end view of the inner flange hub 26 and FIG. 3 is a sectional view of the inner flange hub 26 taken through section line 3—3 of FIG. 2. The recess for receiving the boot 52 of the coupling element 24, which is formed between the flange portion 50 and extension 48 of the external flange 30 (see FIG. 1) comprises a compression surface 70 and base surface 72. The base surface 70 receives and supports the boot 52 of the flexible coupling element 24, while the compression surface 72 resists axial movement of the boot 52 as the boot is compressed. The locknut 34 is rotated onto the threaded surface 68 of the hub 26 to force the external flange 30 against the stop 46 to compress and secure the coupling element 24. In this example, compression surface 72 is logically located on the flange portion 50 of the inner flange hub 26. Moreover, one or more anti-rotation recesses 74 mate with anti-rotation projections of the external flange 30 (see FIG. 4) to prevent rotation of the external flange 30 with respect to the hub 26.

In the tapered sleeve 38 arrangement which secures the hub 26 to the shaft 12, the lip 60 and distal end 64 of the hub 26 interface with the sleeve nut 42 (see FIG. 6). Again, the hub 26 comprises an extension having an annular groove 58 formed by the lip 60 for receiving the sleeve nut 42 to secure the hub 26 to the shaft 12. As for the tapered inner surface 54 of the hub 26 that engages the sleeve 38, the tapered start 76 is shown in FIG. 3. In this example, the inner surface 54 of the hub 26 tapers from left to right to a slightly increasing inner diameter to accommodate the outer surface of the sleeve 38 that tapers in the opposite direction. It should be emphasized that the illustrated tapered bore configuration is by example only. Other configurations, such as a straight bore hub with more than one tapered sleeve inserted between a the hub and shaft, may be implemented.

Figure 4:
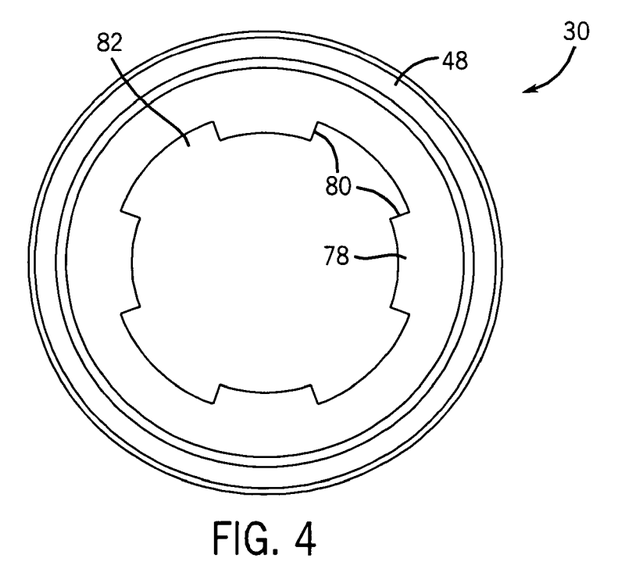
FIG. 4 is an end view of an external flange of the coupling system illustrated in FIG. 1 and showing surfaces for retaining a flexible coupling element and providing anti-rotation.

FIG. 4 illustrates an end view of the external flange 30. The extension 48 of the external flange 30 (in conjunction with the flange portion 50 of the inner flange hub 26) receives the boot 52 to hold and compress the boot of the coupling element 24. Further, as indicated in the discussion of hub 26 illustrated in FIGS. 2 and 3, anti-rotation elements may be provided to prevent rotation of the external flange 30 with respect to the hub 26. For example, optional anti-rotation projections 78 and anti-rotation faces 80 within anti-rotation recesses 82 are provided on external flange 30 may mate with optional anti-rotation elements of the inner flange hub 26 (see FIGS. 2 and 3) to prevent rotation of the two components with respect to one another.

FIG. 5 illustrates a side view of locknut 34 used to secure the hub assembly 16 components and to compress the coupling element 24. Tool recesses 84 are configured to receive an instrument, such as a spanner wrench, to rotate and tighten the locknut 34 onto the coupling assembly. As previously described, the inner surface 66 of the locknut 34 mates with the threaded surface 68 of the inner flange hub 26 (see FIGS. 2 and 3).

FIG. 6 illustrates sectional views of sleeve 38 and sleeve nut 42 utilized to secure the inner flange hub 26 to the shaft 12. If desired, a nut hole 86 may be provided to receive a set screw to further lock the sleeve nut 42 in place and thus to better secure the hub 26 to the shaft 12. Additionally, an optional exemplary slit 88 may be provided for extension and expansion of the sleeve 38 during assembly and disassembly. Also illustrated are features of the sleeve nut 42 previously discussed, such as the eccentric aperture 90 and internal groove 92, as well as, the lip 94 that inserts into the outer annular groove 58 formed on the extension of the hub 26. The sleeve threads 96 mate with the sleeve nut 42 threads 98, and the tool recesses 100 provide for use of a spanner wrench, for example, to rotate and tighten the sleeve nut 42. Finally, during disassembly, the sleeve nut 42 may be counter rotated (loosened), and the outer surface 102 of the lip 94 on sleeve nut 42 bears against the lip 60 of the inner flange hub 26 to disengage the hub 26 from the shaft 12.

Figure 7:
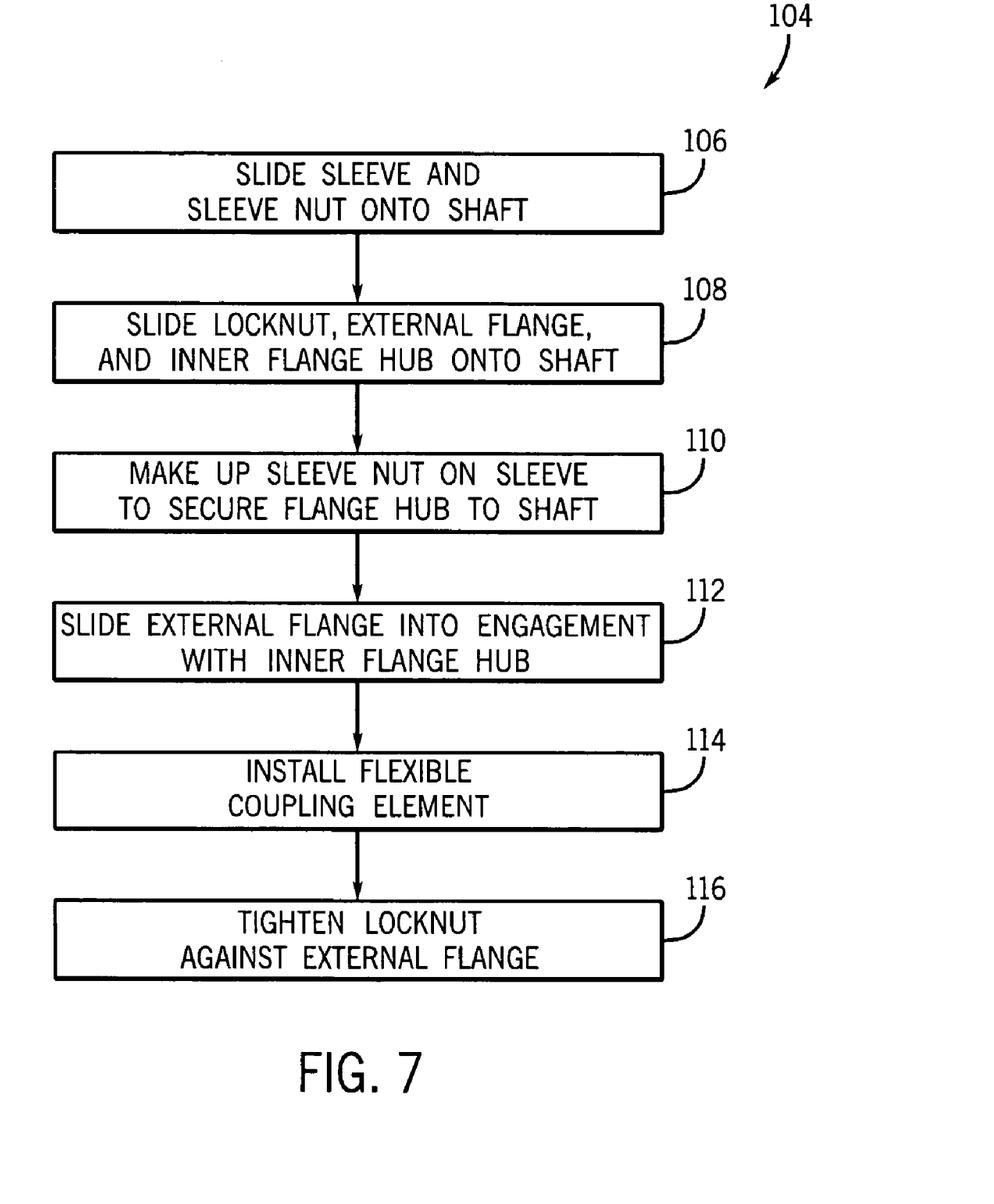
FIG. 7 is block diagram of a method for assembling the coupling system illustrated in FIG. 1.

FIG. 7 is a block diagram of an assembly method 104 for installing either side of the coupling system 10 illustrated in FIG. 1. In one embodiment, the method 104 may be used to mount either hub assembly 16 and 18 to their respective shafts 12 and 14. In general, the method 104 may be applied to the mounting of any number of structures (such as hub assemblies) onto mechanical elements (such as shafts). For convenience, the reference numerals for the first hub assembly 16 (and first shaft 12) are primarily used in the discussion of the depicted method. Finally, it should also be noted that a variety of assembly sequences may employ one or more of the actions describe in the method 104 in varying order.

Initially, to install the hub assembly 16, the sleeve 38 and sleeve nut 42 may be slid onto the shaft 12 (block 106). The locknut 34, external flange 30, and inner flange hub 26 may then be placed onto the shaft (block 108). At this point, the components may be hanging loose on the shaft 12, for example. To secure the inner flange hub 26 to the shaft 12, the sleeve nut 42 is made up onto the sleeve 38, as referenced in block 110. Once the inner flange hub 26 is secured to the shaft 12, the external flange 30 may then be moved into engagement with the inner flange hub 26 to form the peripheral recess between the flange portion 50 of the inner flange hub 26 and the extension 48 of the external flange 30 (block 112). The boot 52 of the flexible coupling element 24 may then be inserted into the peripheral recess formed by the flange portion 50 and extension 48 (block 114).

It should be apparent that installation of the second assembly 18 (on the second shaft 14) may be conducted before, during, or after the installation of the first assembly 16 (on the first shaft 12). As might be expected, a second boot (opposite the first boot) of the flexible coupling element 24 is typically inserted into a recess (similar to that of the first assembly) formed by the second inner flange hub 28 and the extension on the second external flange 32.

Lastly, as referenced in block 116, for the first hub assembly 16, the locknut 34 is rotated and tightened, urging the external flange 30 into engagement with the inner flange hub 26 to secure and compress the coupling element 24. It should be noted that an additional locking mechanism or device, such as a lock washer or set screw configuration, may also be applied to further secure the locknut 34 to the hub assembly 16. Thus, the locknut 34 may be more dependably threaded onto the threaded surface 68 of the inner flange hub 26 to maintain the assembly 16 intact. In conclusion, after the boots on both sides of the flexible coupling element 24 are inserted in the respective recesses, and compressed and secured via tightening of the exemplary locknuts, the hubs 26 and 28 are secured to the shafts 12 and 14, and the two shafts 12 and 14 secured to one another.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A coupling assembly comprising:

a hub having a flange configured to bear against a flexible coupling element, wherein the hub has a tapered inner surface configured to interface with an outer tapered surface of a sleeve;

a sleeve having an outer tapered surface and a threaded extension, wherein the sleeve is mountable on a shaft;

a sleeve nut having inner threads configured to mate with the threaded extension of the sleeve to secure the hub with a shaft;

an external flange element configured to engage the hub to exert compressive force on the flexible coupling element; and a nut having inner threads and configured to mate with a threaded extension of the hub to urge the hub and the external flange element into engagement with the flexible coupling element.

2. The coupling assembly of claim 1, wherein to prevent rotation of the external flange element with respect to the hub, the hub further includes at least one anti-rotation recess and the external flange further includes a generally corresponding anti-rotation projection.

3. The coupling assembly of claim 1, wherein the sleeve nut comprises an eccentric aperture forming a groove and lip adapted to facilitate mounting of the sleeve nut to the sleeve.

4. The coupling assembly of claim 1, further comprising a set screw, wherein the sleeve nut comprises a nut hole configured to receive the set screw to further secure the nut on the threaded extension of the sleeve.

5. A system for securing two generally axially-aligned shafts, the system comprising:
  (a) a flexible coupling element configured to be received by both a first hub assembly and a second hub assembly, to secure a first shaft with a second shaft;
  (b) a first hub assembly comprising:
    a first hub having a flange and mountable on the first shaft, the flange of the first hub bearable against the flexible coupling element, the first hub having a threaded extension;
    a first outer flange configured to engage the first hub to exert compressive force on the flexible coupling element; and
    a first nut having inner threads and configured to mate with the threaded extension of the first hub to force the first hub flange and the first outer flange into engagement with the flexible coupling element;
  (c) a second hub assembly comprising:
    a second hub having a flange and mountable on the second shaft, the flange of the second hub bearable against the flexible coupling element, the second hub having a threaded extension;
    a second outer flange configured to engage the second hub to exert compressive force on the flexible coupling element; and
    a second nut having inner threads and configured to mate with the threaded extension of the second hub to force the second hub flange and the second outer flange into engagement with the flexible coupling element; and
  (d) sleeves and locking members, wherein the hubs comprise tapered inner surfaces that interface with tapered outer surfaces of sleeves, the sleeves having threaded extensions configured to receive locking members to secure the hubs to the shafts.

6. The system of claim 5, wherein to prevent rotation of the first and second outer flanges with respect to the first and second hubs, respectfully, the first hub further includes at least one anti-rotation recess with the first outer flange having a generally corresponding anti-rotation projection, and the second hub further includes at least one anti-rotation recess with the second outer flange having a generally corresponding anti-rotation projection.

7. The system of claim 5, wherein the locking members have an eccentric aperture forming a varying depth inner groove to receive concentric lips formed on extensions of the hubs, to secure the hubs to the shafts.

8. The system of claim 5, wherein an outer diameter of the first shaft is the same size as the outer diameter of the second shaft.

9. The system of claim 8, wherein the inner diameter of the first hub is the same size as the inner diameter of the second hub.

10. A coupling assembly comprising:
  a hub having a flange configured to bear against a flexible coupling element, wherein the hub has a tapered inner surface configured to interface with an outer tapered surface of a sleeve, the sleeve mountable on a shaft and having a threaded extension;
  a first nut having inner threads configured to mate with the threaded extension of the sleeve to secure the hub with the shaft, wherein the first nut comprises an eccentric aperture forming a groove and lip adapted to facilitate mounting of the first nut to the sleeve;
  an external flange element configured to engage the hub to exert compressive force on the flexible coupling element; and
  a second nut having inner threads and configured to mate with a threaded extension of the hub to urge the hub and the external flange element into engagement with the flexible coupling element.

11. A system for securing two generally axially-aligned shafts, the system comprising:
  (a) a flexible coupling element configured to be received by both a first hub assembly and a second hub assembly, to secure a first shaft with a second shaft;
  (b) a first hub assembly comprising:
    a first hub having a flange and mountable on the first shaft, the flange of the first hub bearable against the flexible coupling element, the first hub having a threaded extension;
    a first outer flange configured to engage the first hub to exert compressive force on the flexible coupling element; and
    a first nut having inner threads and configured to mate with the threaded extension of the first hub to force the first hub flange and the first outer flange into engagement with the flexible coupling element;
  (c) a second hub assembly comprising:
    a second hub having a flange and mountable on the second shaft, the flange of the second hub bearable against the flexible coupling element, the second hub having a threaded extension;
    a second outer flange configured to engage the second hub to exert compressive force on the flexible coupling element; and
    a second nut having inner threads and configured to mate with the threaded extension of the second hub to force the second hub flange and the second outer flange into engagement with the flexible coupling element;
  (d) a first sleeve and a first locking member, wherein the first locking member comprises an eccentric aperture having an inner groove adapted to receive a concentric lip formed on the first hub to secure the first hub to the first shaft, wherein the first hub comprises a tapered inner surface adapted to interface with a tapered outer surface of the first sleeve, the first sleeve having a threaded extension configured to receive the first locking member to secure the first hub to the first shaft; and
  (e) a second sleeve and a second locking member, wherein the second locking member comprises an eccentric aperture having an inner groove adapted to receive a concentric lip formed on the second hub to secure the second hub to the second shaft, wherein the second hub comprises a tapered inner surface adapted to interface with a tapered outer surface of the second sleeve, the second sleeve having a threaded extension configured to receive the second locking member to secure the second hub to the second shaft.

12. A coupling assembly comprising:
a hub having a flange configured to bear against a flexible coupling element, wherein the hub has a straight bore configured to interface with an outer surface of an outer sleeve;
an outer sleeve having a tapered inner surface configured to interface with a tapered outer surface of an inner sleeve;
an inner sleeve having a tapered outer surface and an inner surface configured to bear against a shaft, and the inner sleeve having a threaded extension;
an external flange element configured to engage the hub to exert compressive force on the flexible coupling element; and
a nut having inner threads and configured to mate with a threaded extension of the hub to urge the hub and the external flange element into engagement with the flexible coupling element.

13. The coupling assembly of claim 12, comprising a sleeve nut having inner threads configured to mate with the threaded extension of the inner sleeve to secure the hub with a shaft.

14. The coupling assembly of claim 13, wherein the sleeve nut comprises an eccentric aperture forming a groove and lip having a varying depth.

* * * * *